US012485343B2

(12) United States Patent
Lu et al.

(10) Patent No.: US 12,485,343 B2
(45) Date of Patent: Dec. 2, 2025

(54) CONTROL ASSEMBLY

(71) Applicant: DEXIN CORP., New Taipei (TW)

(72) Inventors: Ho Lung Lu, New Taipei (TW); Chin-Lung Lin, New Taipei (TW); Tzu-Hua Tseng, New Taipei (TW)

(73) Assignee: DEXIN CORP., New Taipei (TW)

( * ) Notice: Subject to any disclaimer, the term of this patent is extended or adjusted under 35 U.S.C. 154(b) by 318 days.

(21) Appl. No.: 18/112,419

(22) Filed: Feb. 21, 2023

(65) Prior Publication Data

US 2024/0058693 A1 Feb. 22, 2024

Related U.S. Application Data

(60) Provisional application No. 63/399,945, filed on Aug. 22, 2022.

(30) Foreign Application Priority Data

Nov. 16, 2022 (TW) ................................ 111143676

(51) Int. Cl.
*A63F 13/24* (2014.01)

(52) U.S. Cl.
CPC ................................ *A63F 13/24* (2014.09)

(58) Field of Classification Search
CPC ................................ A63F 13/24
See application file for complete search history.

(56) References Cited

U.S. PATENT DOCUMENTS

| | | | | |
|---|---|---|---|---|
| 2019/0022522 | A1* | 1/2019 | Croft | G06F 3/0338 |
| 2021/0275907 | A1* | 9/2021 | Khaira | A63F 13/92 |
| 2021/0283515 | A1* | 9/2021 | Del Valle | H04M 1/04 |

* cited by examiner

*Primary Examiner* — Yingchuan Zhang
(74) *Attorney, Agent, or Firm* — Maschoff Brennan

(57) ABSTRACT

A control assembly includes two controllers and a retractable and foldable mechanism including a retractable part and two pivot joints, the two pivot joints are respectively pivotally connected to two opposite ends of the retractable part, the two controllers are respectively pivotally connected to the two pivot joints so that the two controllers are movably connected to the retractable part via the two pivot joints, respectively.

11 Claims, 15 Drawing Sheets

CONTROL ASSEMBLY

CROSS-REFERENCE TO RELATED APPLICATIONS

This application claims the priority benefits of U.S. provisional application Ser. No. 63/399,945, filed on Aug. 22, 2022 and priority under 35 U.S.C. § 119(a) on Patent Application No(s). 111143676 filed in Taiwan (R.O.C.) on Nov. 16, 2022. The entirety of each of the above-mentioned patent application is hereby incorporated by reference herein.

TECHNICAL FIELD

The disclosure relates to a control assembly for portable electronic device.

BACKGROUND

In recent years, with the development of science and technology, people can play various games on smartphones. Meanwhile, the smartphone's screen trend is changed from physical keyboard to touch screen, thus smartphone games are mostly designed to be touchscreen-based. Even though there is a virtual controller shown on screen, it is very inconvenient to play because the virtual controller hides some part of the screen and lacks tactile feedback.

To this end, smartphone-based controllers are developed to provide physical buttons for users to run games smoothly. However, the conventional smartphone-based controllers are large in size and unable to fit into small space.

SUMMARY

Accordingly, one aspect of the disclosure is to provide a control assembly capable of folded into a smaller size and therefore is more portable.

One embodiment of the disclosure provides a control assembly including two controllers and a retractable and foldable mechanism including a retractable part and two pivot joints, the two pivot joints are respectively pivotally connected to two opposite ends of the retractable part, the two controllers are respectively pivotally connected to the two pivot joints so that the two controllers are movably connected to the retractable part via the two pivot joints, respectively.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
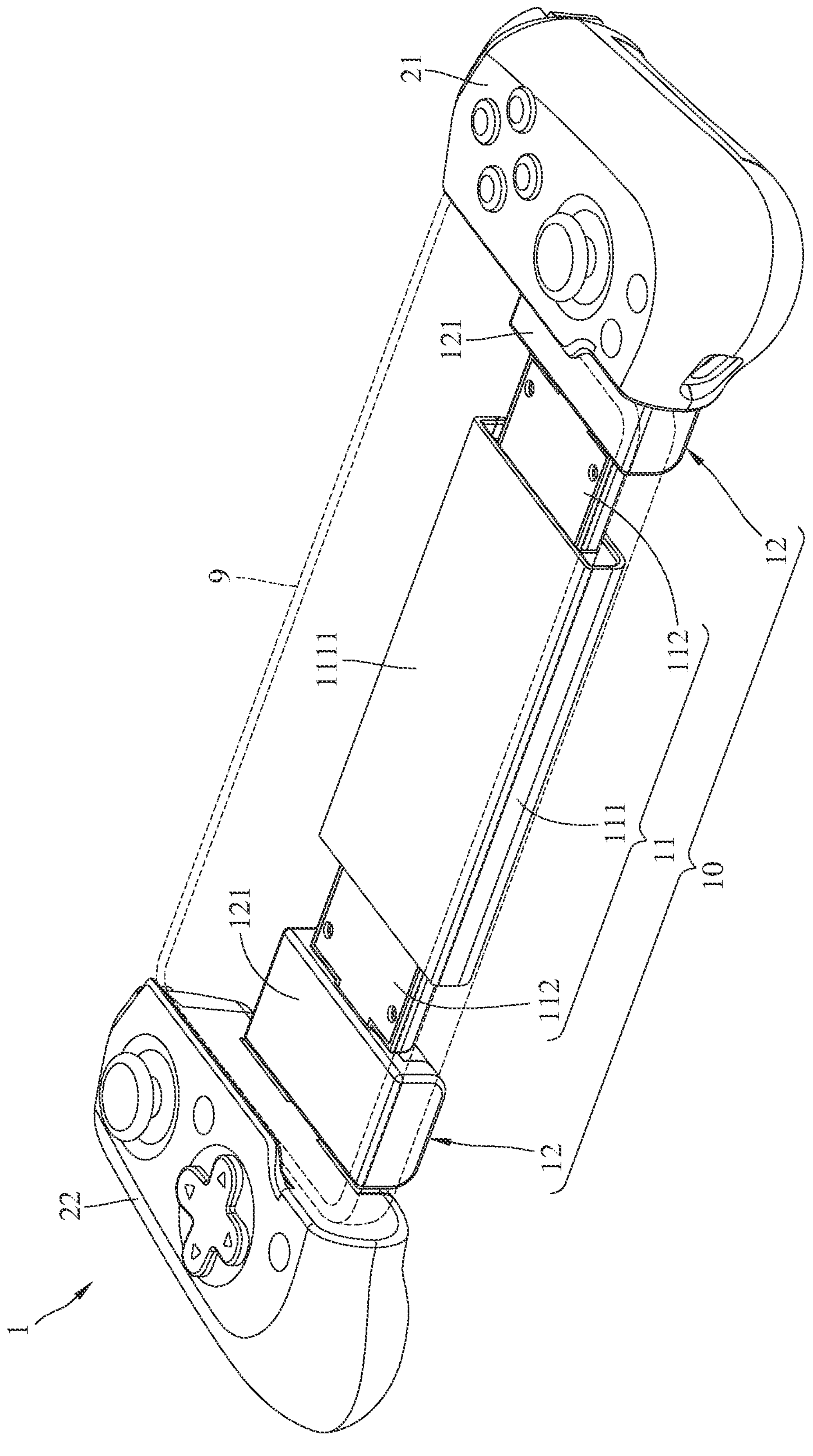
FIG. 1 is a perspective view of a control assembly according to one embodiment of the disclosure when the control assembly is in an extended status and an electronic device is applied thereon.

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Firstly, referring to FIG. 1, one embodiment of the disclosure provides a control assembly 1 configured to be installed on a portable electronic device 9 (also called "electronic device" hereinafter). The electronic device 9 may be any typical smartphone or tablet and is not intended to limit the disclosure. The control assembly 1 may be in communication with the electronic device 9 via a wired or wireless manner and therefore becomes an approach for user to control the electronic device 9.

The control assembly 1 may include a retractable and foldable mechanism 10 and controllers 21 and 22. The retractable and foldable mechanism 10 means the part of the control assembly 1 that is configured to be connected between the controllers 21 and 22 and to support the electronic device 9. As shown, the retractable and foldable mechanism 10 may have a first supporting surface 1111 and at least two second supporting surfaces 121. The first supporting surface 1111 may be located between the second supporting surfaces 121. Optionally, when the retractable and foldable mechanism 10 is in an extended status or a retracted status, the first supporting surface 1111 and the second supporting surfaces 121 may be coplanar with each other so as to support the electronic device 9 together. The controllers 21 and 22 may be any suitable means configured for user to hold in hands to operate the electronic device 9.

The status of the retractable and foldable mechanism 10 is selectively switched. For example, please see FIGS. 1-4 and 6, the retractable and foldable mechanism 10 may be in an extended status, in this status, the retractable and foldable mechanism 10 is able to support the electronic device 9 and the controllers 21 and 22 may be moved outwards to a position suitable for them to clamp the electronic device 9. For example, please see FIGS. 7-10, the retractable and foldable mechanism 10 may be switched to a retracted status from the extended status, in this status, the retractable and foldable mechanism 10 allows the controllers 21 and 22 to be located relatively close to each other so as to reduce the overall size of the control assembly 1 (e.g., shorten the length of the control assembly 1).

In this embodiment, the retractable and foldable mechanism 10 may include a retractable part 11 and two pivot joints 12. The pivot joints 12 means the parts of the retractable and foldable mechanism 10 that are configured to be connected between the controllers 21 and 22 and the retractable part 11. The retractable part 11 means the part of the retractable and foldable mechanism 10 that is configured to be connected between the pivot joints 12. The retractable part 11 is provided for the user to selectively change or adjust the distance between the pivot joints 12 and the controllers 21 and 22 connected to the pivot joints 12. The pivot joints 12 may be similar or the same in configuration, thus only one of the pivot joints 12 will be described in detail below.

In this embodiment, the retractable part 11 may have a first member 111 and two second members 112. The first member 111 means the part of the retractable part 11 that is configured to be sleeved on the second members 112 or able to accommodate at least part of each second member 112. The first member 111 has the first supporting surface 1111. Thus, the first member 111 is also one of the parts of the retractable and foldable mechanism 10 that is configured to support the electronic device 9. The second member 112 means the part of the retractable part 11 that is configured to be connected between the first member 111 and one of the pivot joints 12; in other words, in this embodiment, the first member 111 is connected to the pivot joints 12 via the second members 112. In this embodiment, the second members 112 are slidably disposed through two opposite ends of the first member 111, respectively. One end of the second member 112 is pivotally connected to a side of the pivot joint 12. In other words, the first member 111 is slidably sleeved on the second members 112 and is movably connected to the pivot joints 12 respectively via the second members 112.

The pivot joint 12 has the second supporting surface 121. Thus, the pivot joints 12 are also one of the parts of the retractable and foldable mechanism 10 that is configured to support the electronic device 9. The second member 112 is pivotally connected to a side of the pivot joint 12 while the other side of the pivot joint 12 is pivotally connected to one of the controller (21 or 22).

Figure 2:
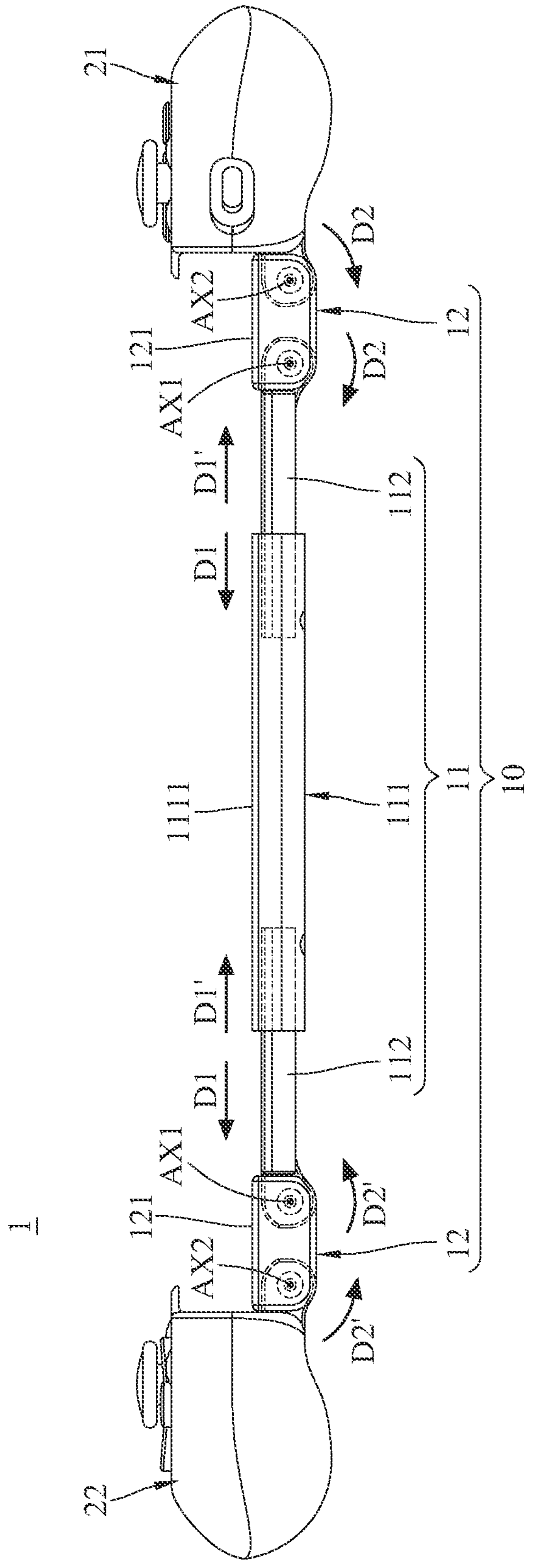
FIG. 2 is a side view of a control assembly in FIG. 1.
Figure 3:
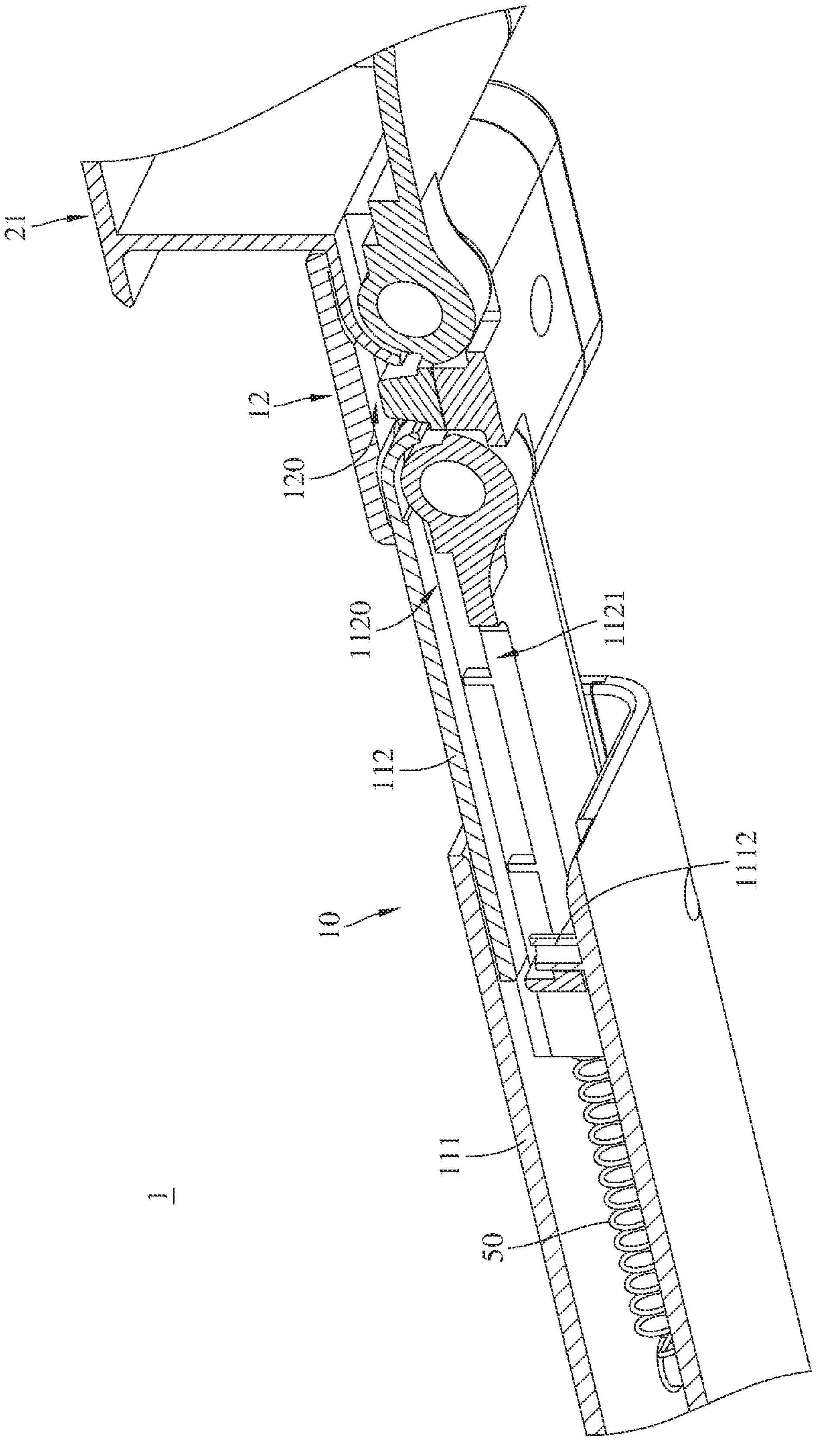
FIGS. 3-4 are partially-enlarged cross-sectional perspective view of the control assembly in FIG. 2.

As such, the distance between the controllers 21 and 22 and the pivot joints 12 connected thereto is adjustable by moving the second members 112 relative to the first member 111 (as the direction D1 or D1' shown in FIGS. 1 and 2). Meanwhile, the angles of the controllers 21 and 22 and the pivot joints 12 to the retractable part 11 are adjustable by pivoting the pivot joints 12 relative to the second members 112. As shown, the controllers 21 and 22 and the pivot joints 12 are pivotable relative to the retractable part 11 about a first axis AX1 (as the direction D2 or D2' shown in FIG. 2). In addition, since the controllers 21 and 22 are respectively pivotally connected to the pivot joints 12, the angles of the controllers 21 and 22 to the retractable and foldable mechanism 10 are adjustable by pivoting the controllers 21 and 22 relative to the pivot joints 12. As shown, the controllers 21 and 22 are pivotable relative to the pivot joints 12 about a second axis AX2 (as the direction D2 or D2' shown in FIG. 2).

Signal/electricity transmission between the controllers 21 and 22 may be achieved by wired manner. For example, in this embodiment, the control assembly 1 may further include a flat cable 40 configured to be electrically connected between the controllers 21 and 22. Corresponding to the flat cable 40, the second member 112 may include a first cable channel 1120, each of the pivot joints 12 may include a second cable channel 120. To clearly see the first cable channel 1120 and the second cable channel 120, the flat cable 40 is omitted from FIG. 3. The flat cable 40 may be any suitable cable capable of enabling the electrical/signal connection between the controllers 21 and 22. The first cable channel 1120 extends from one end of the second member 112 to the other end of the second member 112. The second cable channel 120 extends from one end of the pivot joint 12 to the other end of the pivot joint 12. The second cable channel 120 is exposed to (or, connected to or corresponding to) the first cable channel 1120. Also, two opposite ends of the second cable channel 120 are respectively exposed to (or, connected to or corresponding to) the first cable channel 1120 of the second member 112 and the internal space of one of the controllers (21 or 22). As such, the first cable channels 1120 and the second cable channels 120 together define a passage between the retractable and foldable mechanism 10 and the controllers 21 and 22 for the flat cable 40 to pass through.

Figure 4:
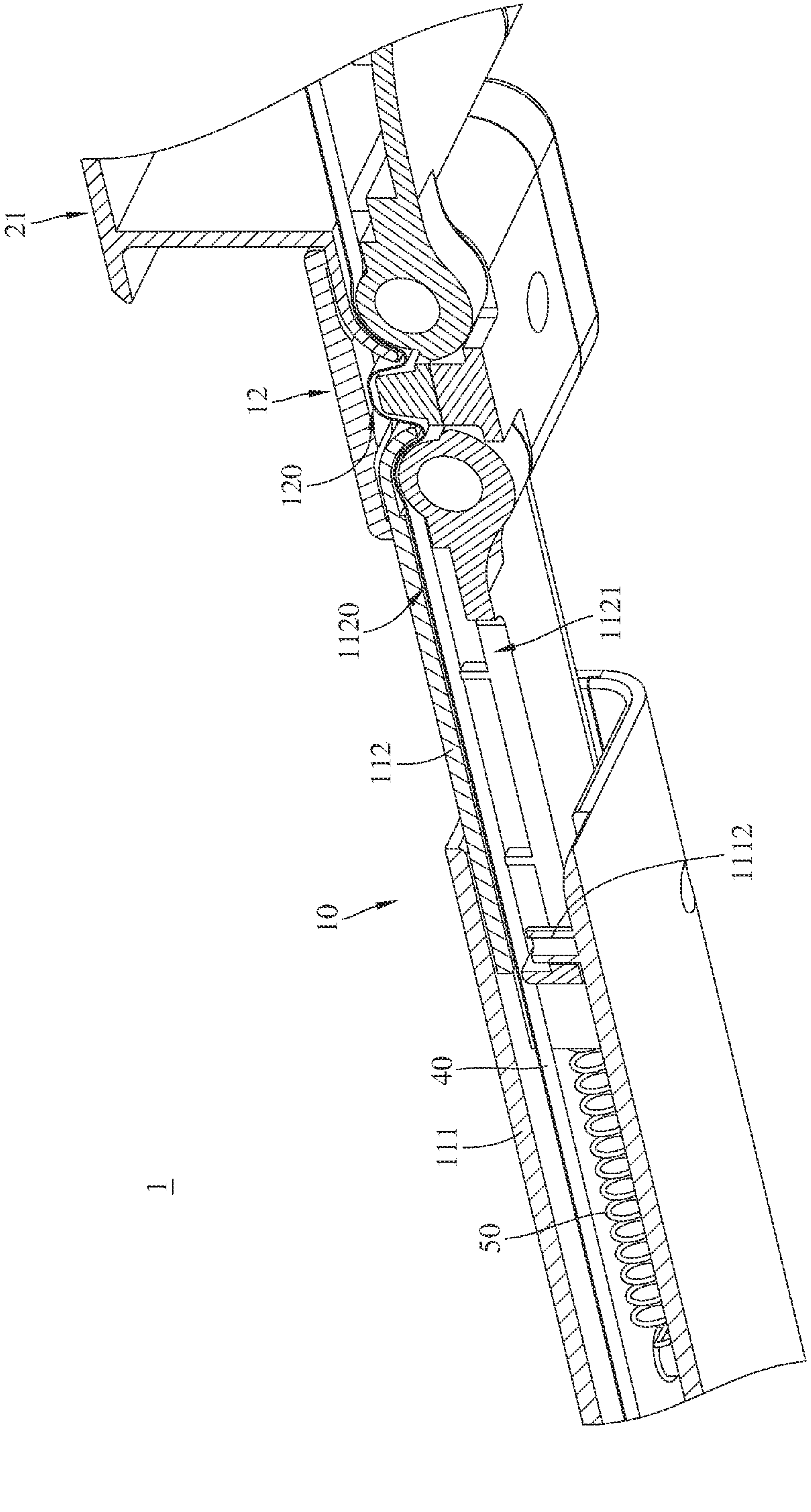
Figure 9:
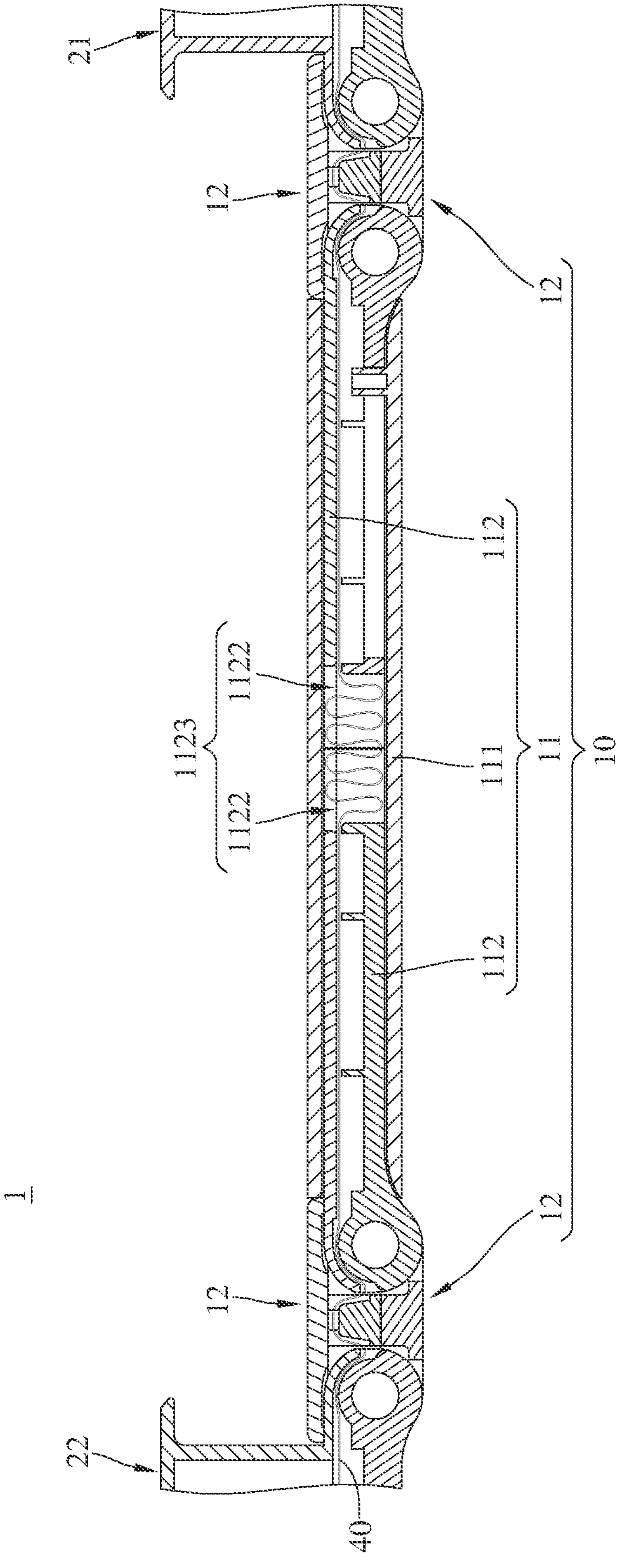
FIG. 9 is a partially-enlarged cross-sectional side view of the control assembly in FIG. 8.

As shown in FIG. 4 or FIG. 9, the part of the flat cable 40 that extends out of the controllers 21 and 22 is disposed through the second cable channels 120 of the pivot joints 12 and the first cable channels 1120 of the second members 112 and is partially accommodated in the space between the second members 112. Such an arrangement for the flat cable 40 still allow the retractable part 11, the pivot joint 12, and the controllers 21 and 22 to move relative to each other as required. Also, the flat cable 40 is completely covered by the controllers 21 and 22, the retractable part 11, and the pivot joint 12 (in other words, the flat cable 40 is completely hidden in the controllers 21 and 22 and the retractable and foldable mechanism 10) during the movements among the retractable part 11, the pivot joint 12, and the controllers 21 and 22.

Figure 5:
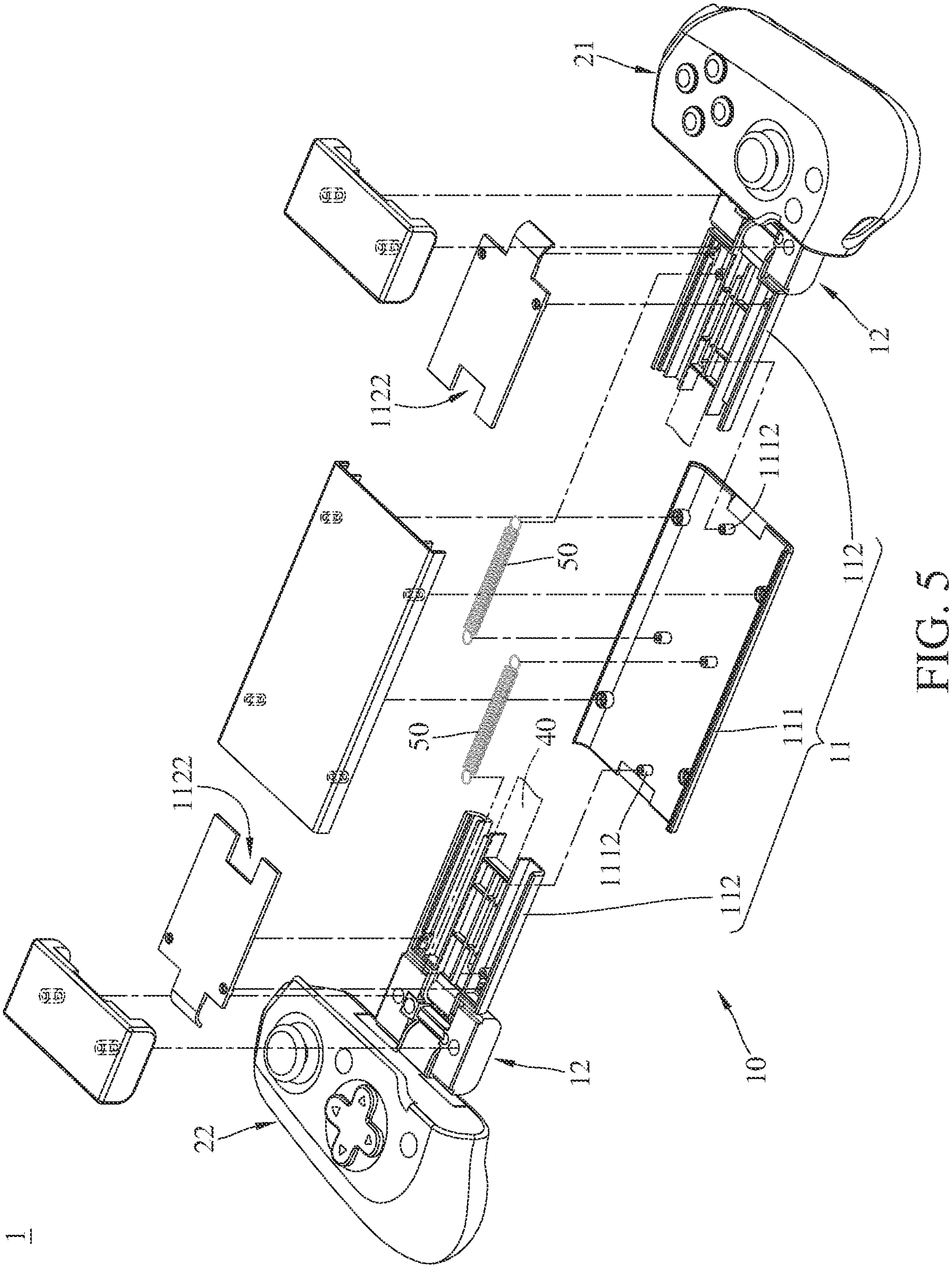
FIG. 5 is an exploded view of the control assembly in FIG. 2.
Figure 6:
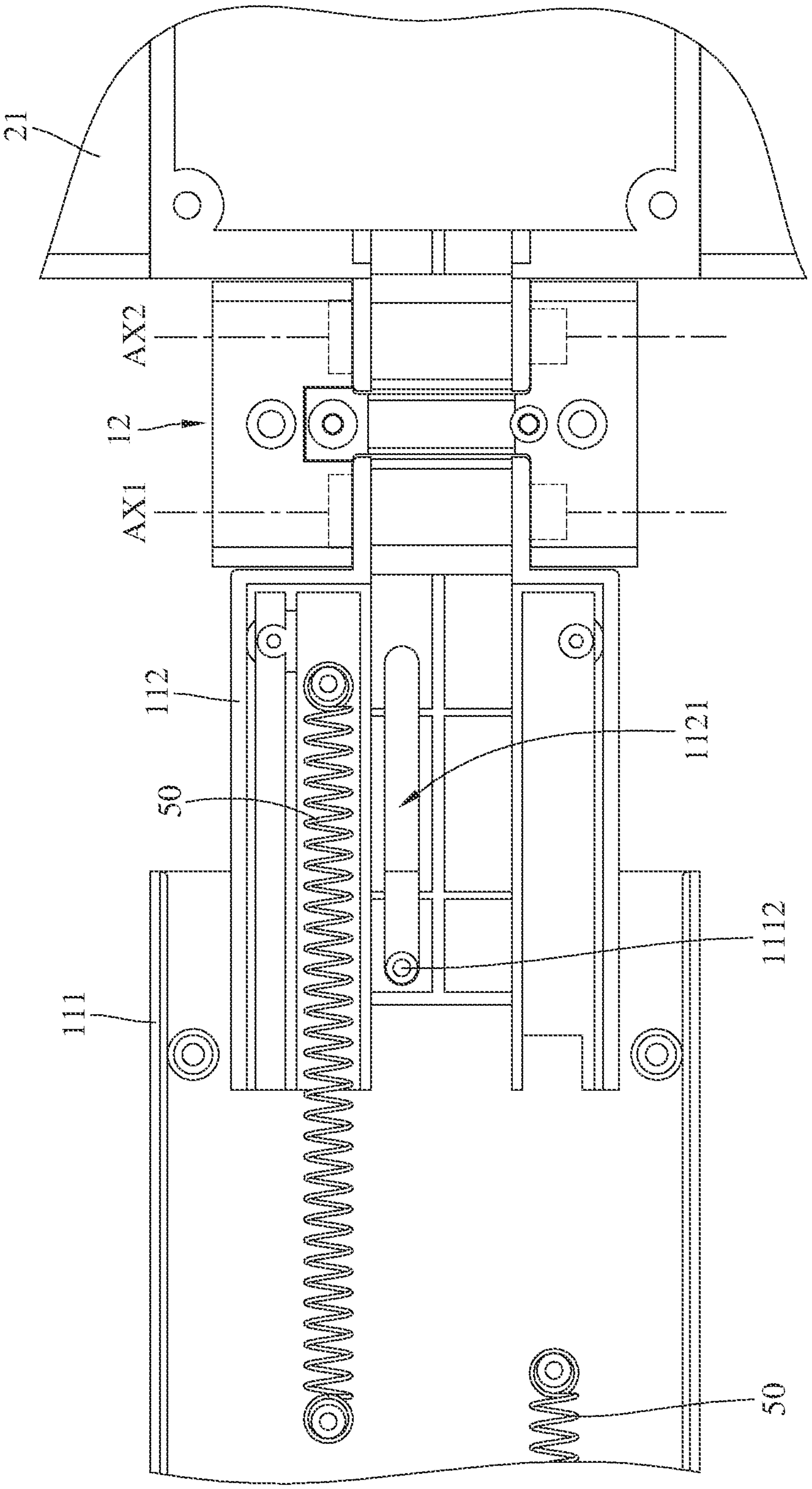
FIG. 6 is a partially-enlarged cross-sectional planar view of the control assembly in FIG. 2.
Figure 7:
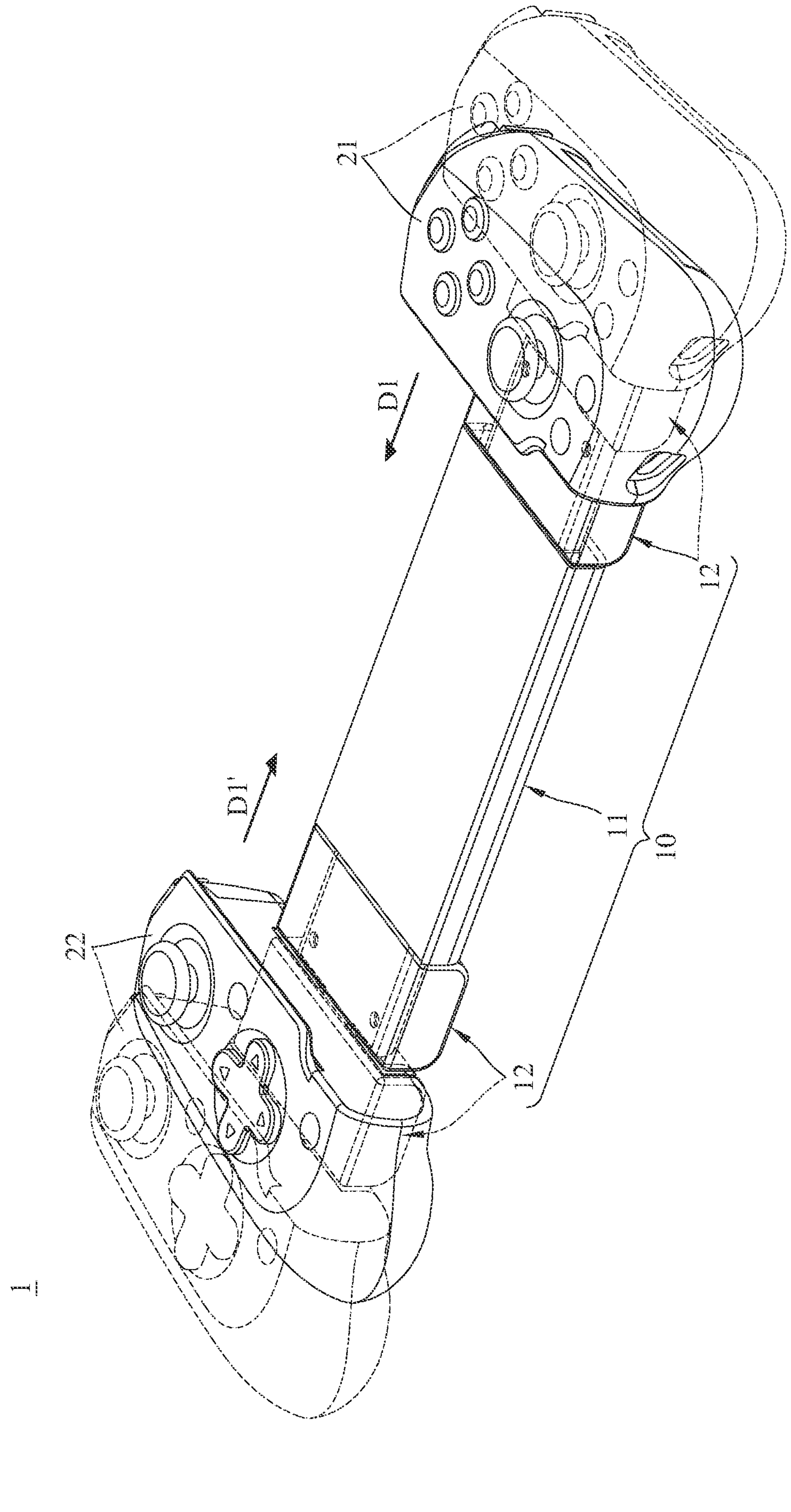
FIG. 7 depicts a perspective view showing the control assembly switched to a retracted status from the extended status.
Figure 8:
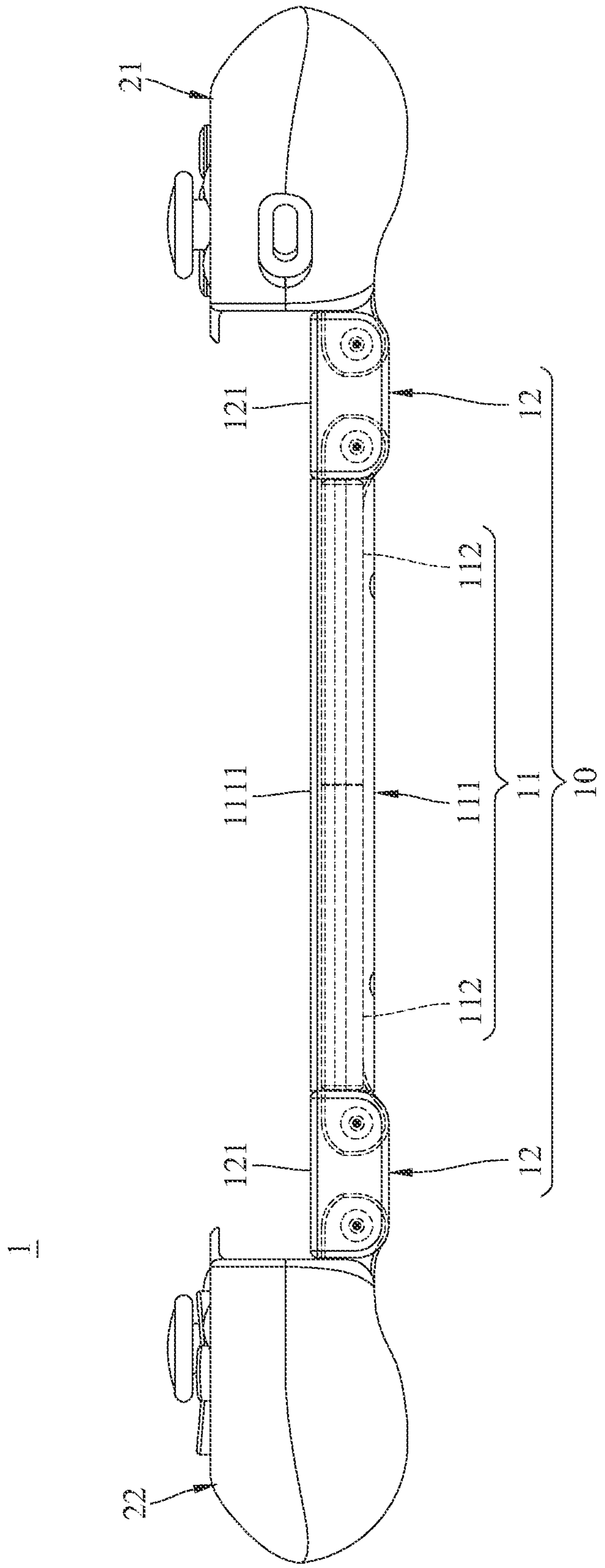
FIG. 8 is a side view of the control assembly according to one embodiment of the disclosure when the control assembly is in the retracted status.

Optionally, as shown in FIGS. 5-6, the first member 111 may have at least one positioning post 1112, the second member 112 may include a groove portion 1121, the positioning post 1112 is slidably disposed through the groove portion 1121 to limit the slidable range of the second member 112 relative to the first member 111.

Figure 10:
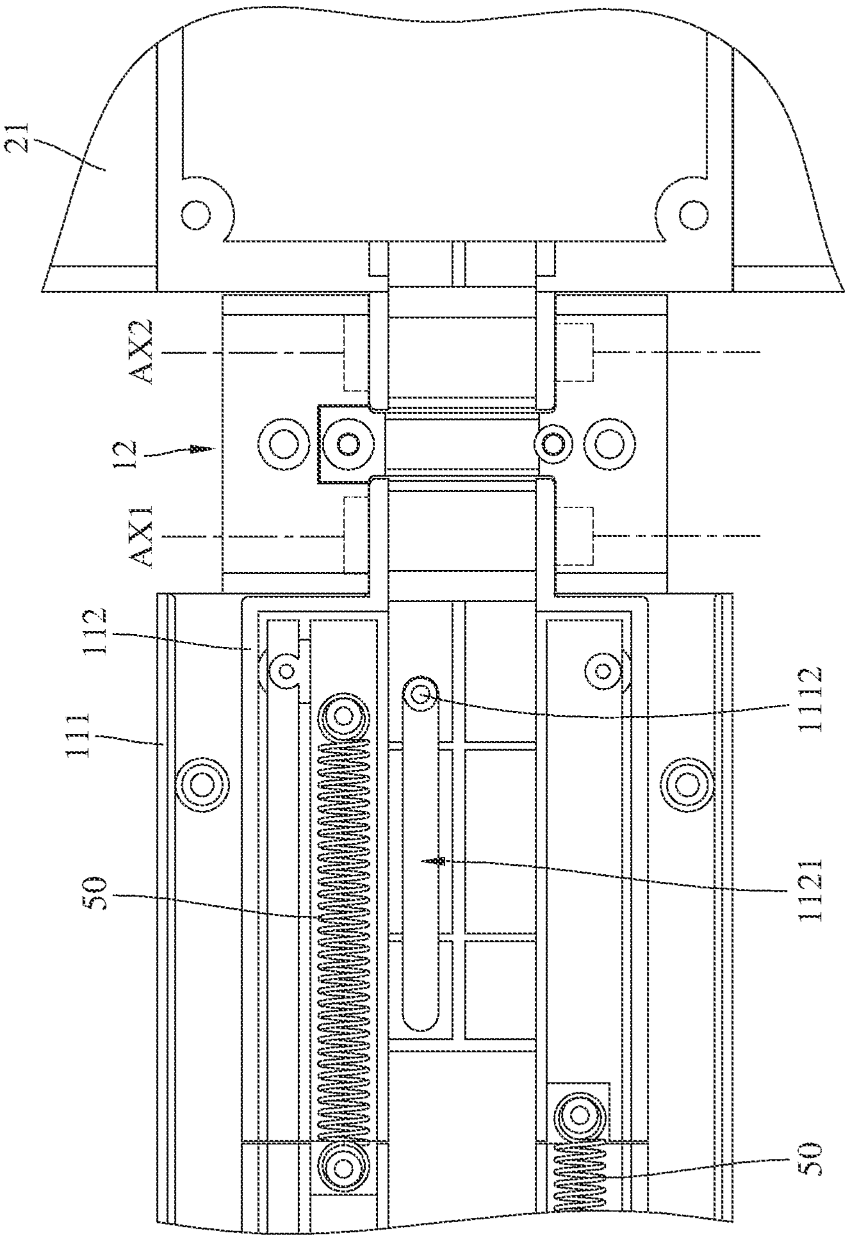
FIG. 10 is a partially-enlarged cross-sectional planar view of the control assembly in FIG. 8.

Optionally, as shown in FIGS. 5-6 and 10, in this embodiment, the retractable and foldable mechanism 10 may further include two elastic members 50, one end of the elastic member 50 is fixed to one of the second members 112, and the other end of the elastic member 50 is fixed to the first member 111. The elastic member 50 may be any suitable extension spring and therefore the elastic member 50 is able to pull the second member 112 into the first member 111.

As shown in FIGS. 1-4 and 6, the retractable and foldable mechanism 10 can be switched to the extended status. By doing so, the controllers 21 and 22 are moved away from each other to make the control assembly 1 fit the length of the electronic device 9, such that the electronic device 9 is allowed to be placed on the retractable and foldable mechanism 10 and clamped by the controllers 21 and 22. While the controllers 21 and 22 are moving outwards, the elastic members 50 between the first member 111 and the second members 112 are extended so as to cause the controllers 21 and 22 to clamp the electronic device 9 tighter and thereby improving the stability of the electronic device 9 on the control assembly 1.

As shown in FIGS. 7-10, when it is attempted to install a shorter electronic device or remove the electronic device, the retractable part 11 pulls the controllers 21 and 22 to come closer to each other so that the retractable and foldable mechanism 10 is switched to the retracted status. For example, when the electronic device 9 is removed from the control assembly 1, the elastic members 50 can automatically pull the second members 112 into the first member 111. As shown, the retractable part 11 can be shortened to a status that makes the second member 112 almost entirely accommodated in the first member 111.

Figure 11:
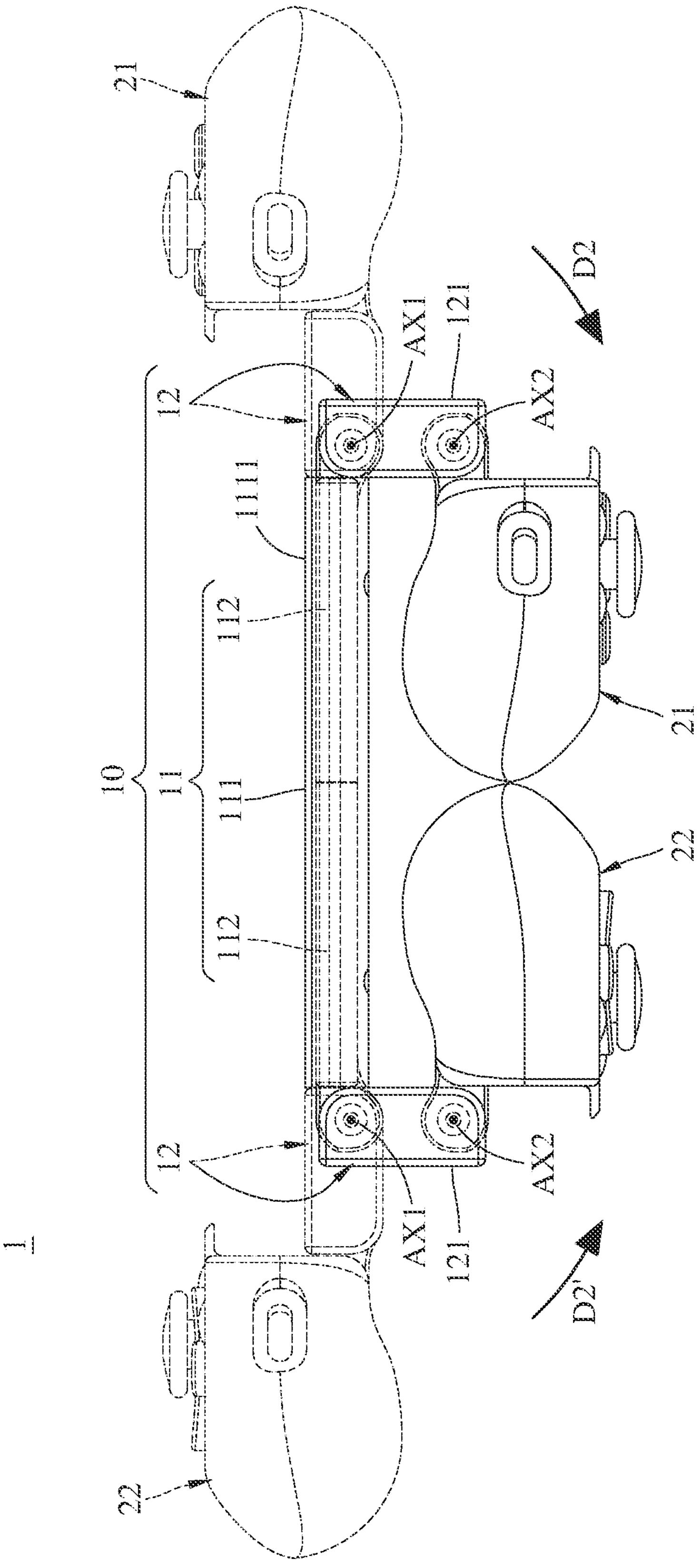
FIGS. 11-12 depict how the control assembly is switched to a folded status.
Figure 12:
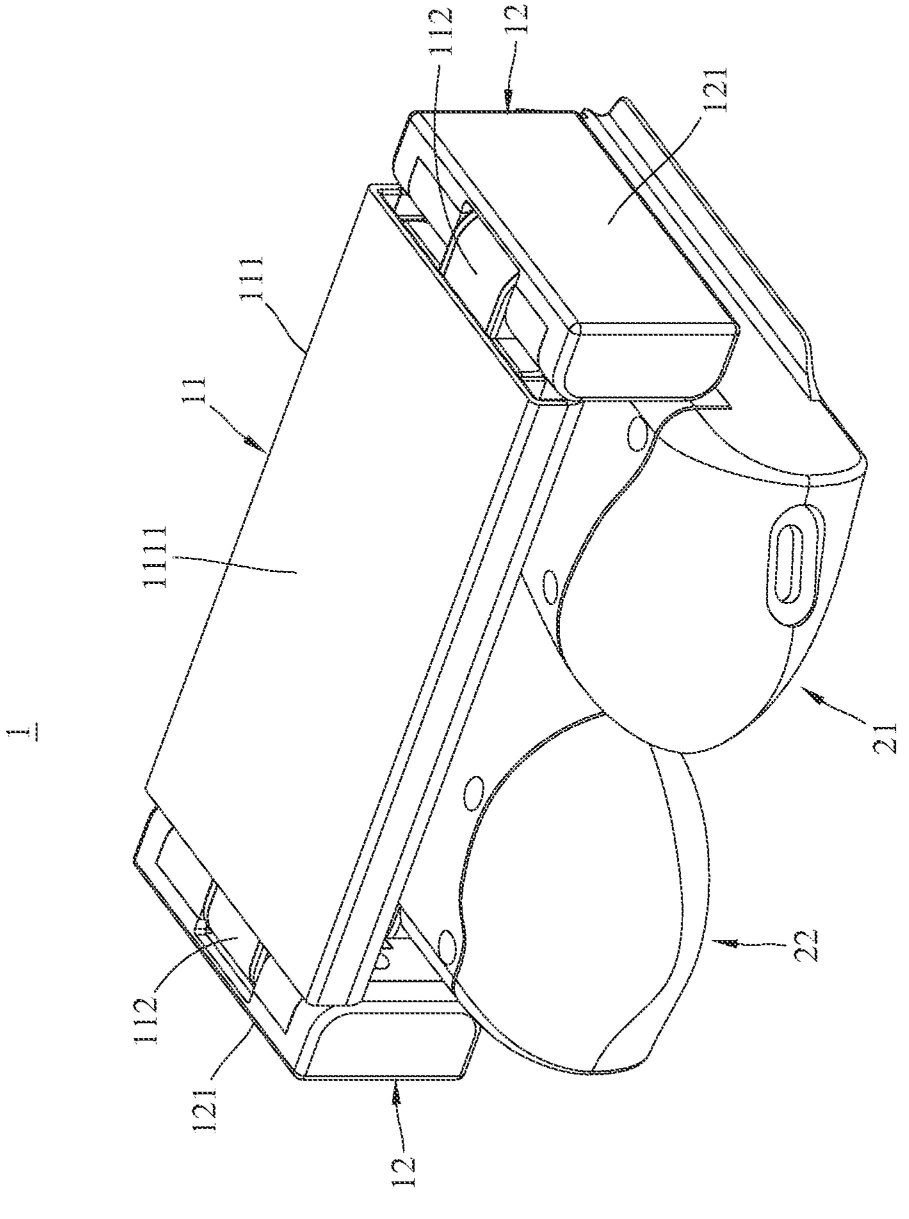
Figure 13:
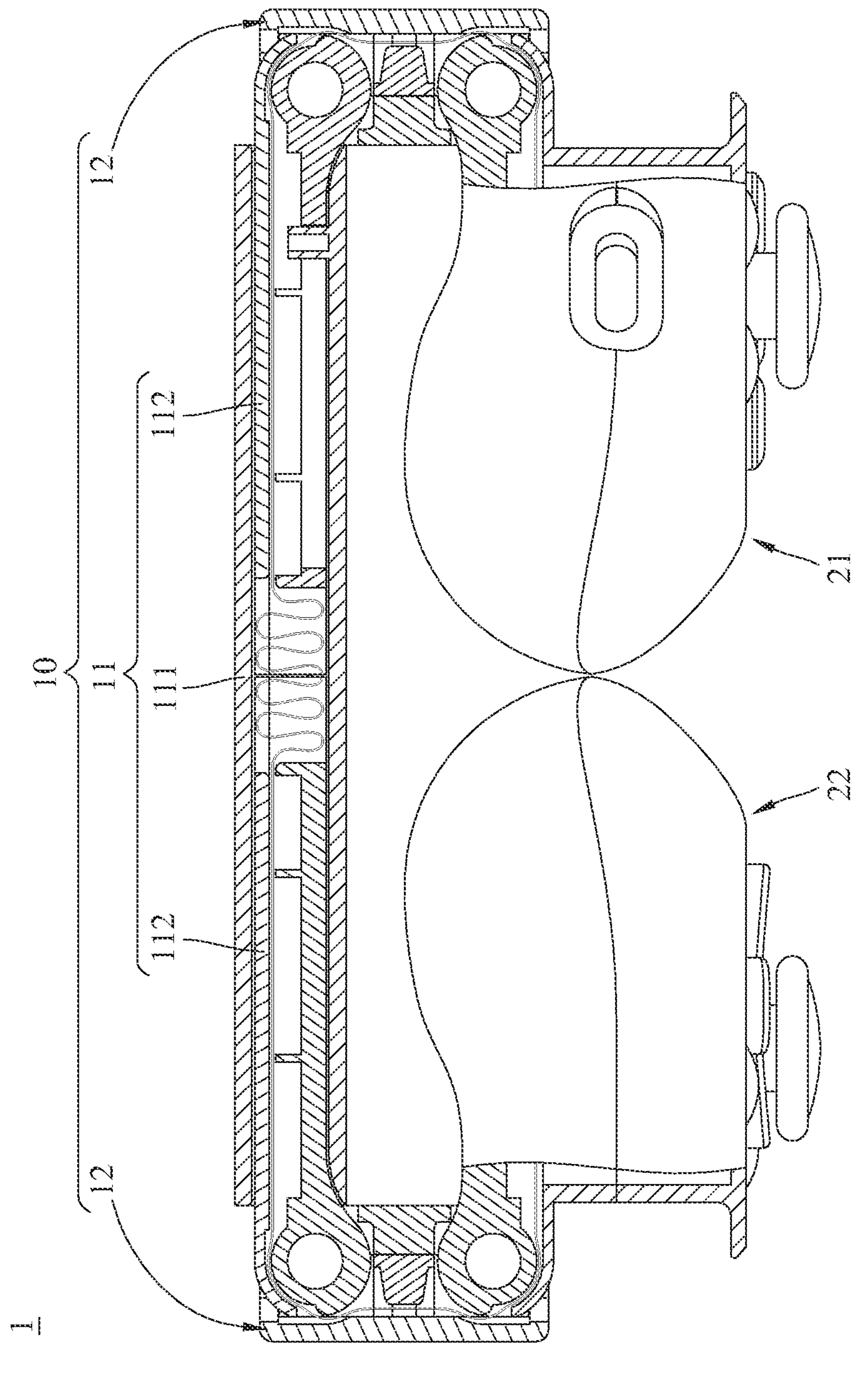
FIG. 13 is a cross-sectional view of the control assembly in FIG. 12.

Further, please see FIGS. 11-13, the retractable and foldable mechanism 10 can be folded to be in a folded status. After the retractable and foldable mechanism 10 reaches the retracted status, the pivot joints 12 can be pivoted relative to the retractable part 11 about the first axis AX1 and the controllers 21 and 22 can be pivoted relative to the pivot joints 12 about the second axis AX2. By doing so, the controllers 21 and 22 may be arranged side by side and located at the same side of the retractable part 11. When the retractable and foldable mechanism 10 is in the folded status, the first supporting surface 1111 on the first member 111 may be substantially perpendicular to the second supporting surface 121 on the pivot joints 12. When the retractable and foldable mechanism 10 is in the folded status, the overall size of the control assembly 1 is significantly reduced and therefore is more portable and can fit into small space. Herein, please see FIGS. 4, 9, and 13, the flat cable 40 is completely hidden in the controllers 21 and 22 and the retractable and foldable mechanism 10 during the status switching of the retractable and foldable mechanism 10, which prevents the flat cable 40 from affecting the appearance of the control assembly 1 and also prevents the flat cable 40 from being affected by external particles and moisture.

The flat cable 40 may spare a certain length in the retractable part 11 for it to respond to the movement of the retractable and foldable mechanism 10. Specifically, as shown in FIGS. 5, 9, and 13, in this embodiment, the second members 112 may each have a cut-out portion 1122. When the retractable and foldable mechanism 10 is in the retracted status, the cut-out portions 1122 of the second members 112 may together define a cable accommodation space 1123 to accommodate the deformed portion of the flat cable 40 inside the first member 111.

Figure 14:
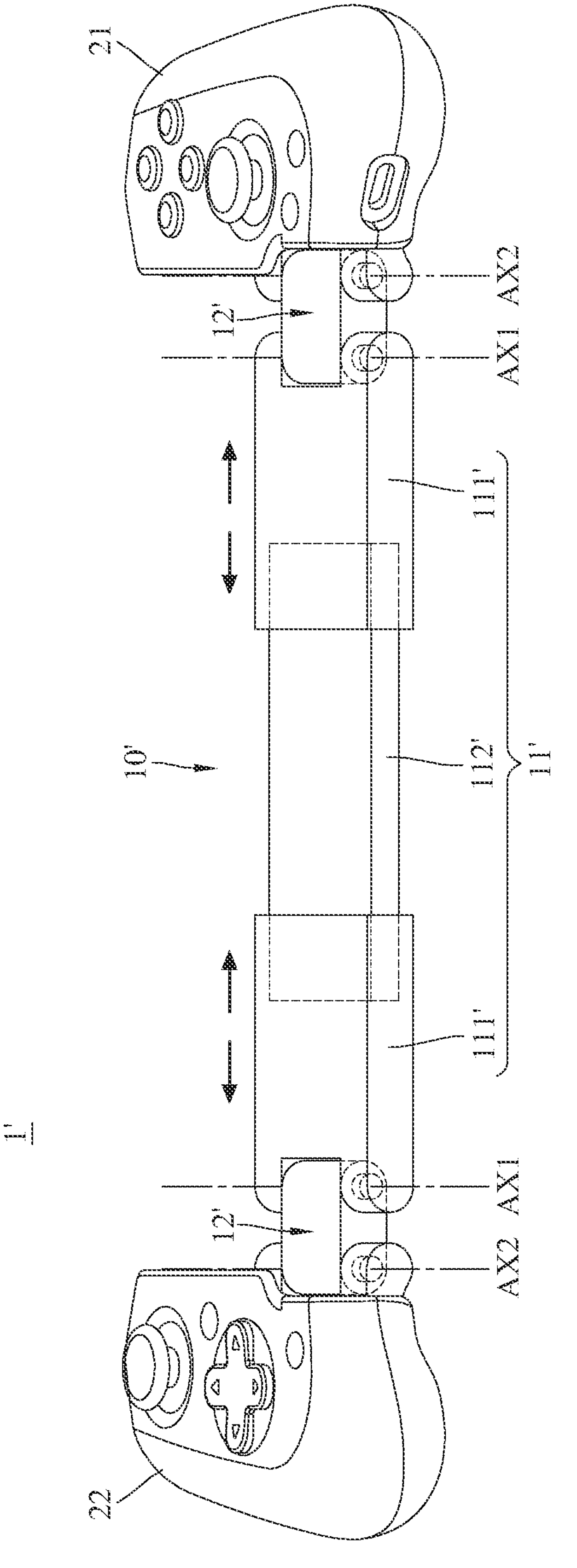
FIG. 14 is a perspective view of a control assembly according to another embodiment of the disclosure.

The aforementioned control assemblies are exemplary and may be modified as required. For example, please refer to FIG. 14, another embodiment of the disclosure provides a control assembly 1'. For the simplicity, only the differences between the previous embodiment and the following embodiment will be described in detail below. As shown, in a retractable and foldable mechanism 10' of the control assembly 1', a retractable part 11' may include two first members 111' and a second member 112', the first members 111' may be respectively slidably sleeved on two opposite portions of the second member 112'. The first members 111' may expose the second member 112' when the retractable and foldable mechanism 10' is in the extended status. When the retractable and foldable mechanism 10' is in the retracted status, the second member 112' may be hidden in the first members 111'. In this embodiment, the second member 112' is connected to the pivot joints 2' via the first members 111'. As such, the controllers 21 and 22 and the pivot joints 12' connected thereto are pivotable relative to the retractable part 11' about the first axis AX1, and the controllers 21 and 22 are pivotable relative to the pivot joints 12' about the second axis AX2.

Figure 15:
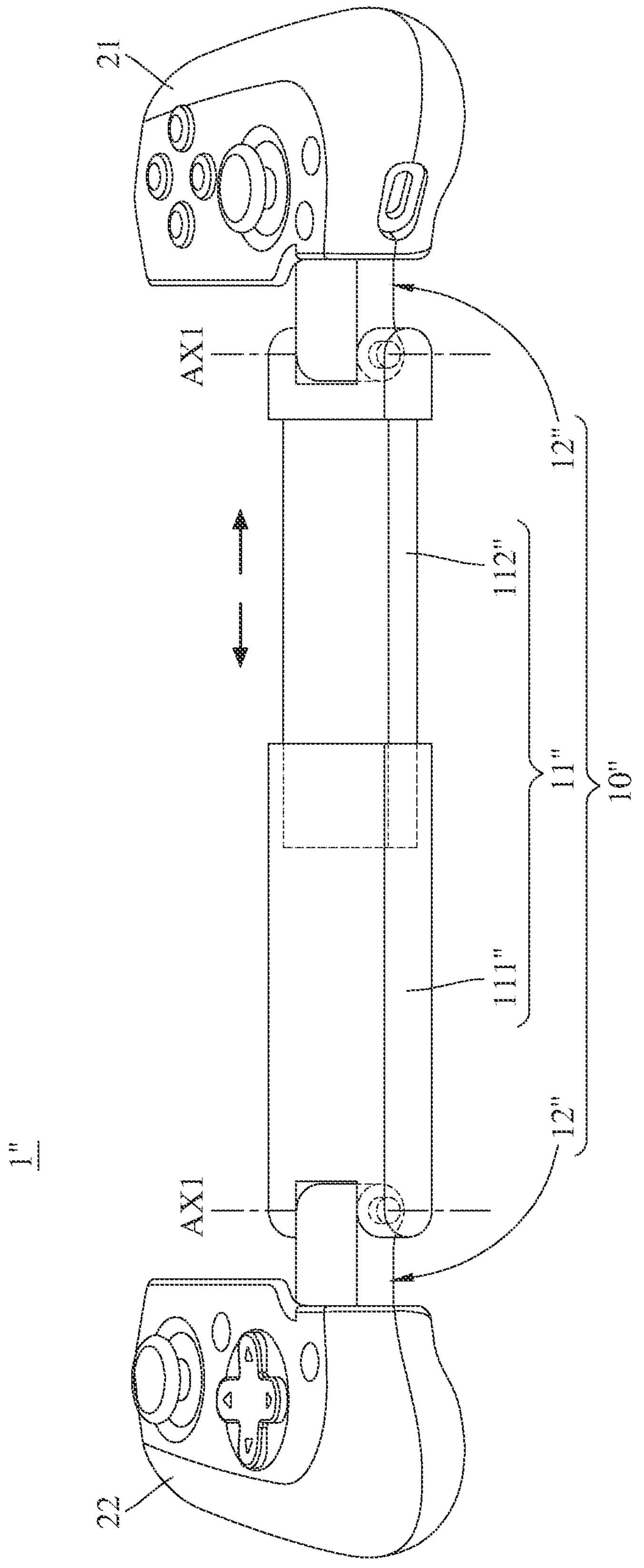
FIG. 15 is a perspective view of a control assembly according to still another embodiment of the disclosure.

For another example, please refer to FIG. 15, another embodiment of the disclosure provides a control assembly 1". For the simplicity, only the differences between the previous embodiment and the following embodiment will be described in detail below. As shown, in a retractable and foldable mechanism 10" of the control assembly 1", a retractable part 11" may include a first member 111" and a second member 112", the first member 111" may be slidably sleeved on the second member 112". The first member 111" may expose the second member 112" when the retractable and foldable mechanism 10" is in the extended status. When the retractable and foldable mechanism 10" is in the retracted status, the second member 112" may be hidden in the first member 111". In this embodiment, the second member 112" is connected to one of the pivot joints 12" via the first member 111", and the first member 111" is connected to the other pivot joint 12" via the second member 112". As such, the controllers 21 and 22 and the pivot joints 12" connected thereto are pivotable relative to the first member 111" and the second member 112" of the retractable part 11" about the first axis AX1.

According to the control assembly as discussed in the above embodiments of the disclosure, the pivot joint pivotally connected between the retractable part and the controllers so that the controllers are movably connected to two opposite ends of the retractable part respectively via the pivot joints, thus the distance between the controllers is adjustable to adopt lengths of different electronic devices, and the control assembly is able to be transformed into a smaller and more portable size by adjusting the positions and angle of the controllers and the pivot joints and/or the retractable part and changing the relationships among the controllers, the pivot joints, and the retractable part.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control assembly, comprising:

two controllers; and a retractable and foldable mechanism comprising a retractable part and two pivot joints, wherein the two pivot joints are respectively pivotally connected to two opposite ends of the retractable part, the two controllers are respectively pivotally connected to the two pivot joints so that the two controllers are movably connected to the retractable part via the two pivot joints, respectively;

wherein each of the two pivot joints have a first side and a second side located opposite to each other, the first sides of the two pivot joints are respectively pivotally connected to the two opposite ends of the retractable part, and the second sides of the two pivot joints are respectively pivotally connected to the two controllers.

2. The control assembly according to claim 1, wherein the retractable part comprises a first member and two second members, the two second members are respectively slidably disposed through two opposite ends of the first member, and the two second members are respectively pivotally connected to the two pivot joints so that the two second members are movably connected to the two controllers respectively via the two pivot joints.

3. The control assembly according to claim 2, further comprising a flat cable, wherein the two second members each has a first cable channel, the two pivot joints each has a second cable channel connected to the first cable channel, the flat cable is disposed through the first cable channels of the two second members and the second cable channels of the two pivot joints and is electrically connected between the two controllers.

4. The control assembly according to claim 3, wherein the two controllers, the retractable part and the two pivot joints completely cover the flat cable.

5. The control assembly according to claim 3, wherein the two second members each has a cut-out portion, when the retractable and foldable mechanism is in a retracted status, the two second members is accommodated in the first member, and the cut-out portions of the two second members together define a cable accommodation space for accommodating at least part of the flat cable.

6. The control assembly according to claim 2, further comprising two elastic members, wherein two opposite ends of each of the two elastic members are respectively fixed to the first member and one of the second members.

7. The control assembly according to claim 2, wherein when the retractable and foldable mechanism is in an extended status, a first supporting surface of the first member and a second supporting surface of each of the pivot joints are coplanar with each other.

8. The control assembly according to claim 1, wherein the retractable part comprises two first members and a second member, the two first members are respectively slidably sleeved on two opposite portions of the second member, and the two first members are respectively pivotally connected to the two pivot joints so that the two first members are movably connected to the two controllers respectively via the two pivot joints.

9. The control assembly according to claim 1, wherein the retractable part comprises a first member and a second member, the first member is slidably sleeved on the second member, the first member and the second member are respectively pivotally connected to the two pivot joints so that the first member and the second member are movably connected to the two controllers respectively via the two pivot joints.

10. The control assembly according to claim 1, wherein the retractable and foldable mechanism has a folded status, when the retractable and foldable mechanism is in the folded status, the two controllers are arranged at a same side of the retractable part respectively via the two pivot joints.

11. A control assembly, comprising:

two controllers; and a retractable and foldable mechanism comprising a retractable part and two pivot joints, wherein the two pivot joints are respectively pivotally connected to two opposite ends of the retractable part, the two controllers are respectively pivotally connected to the two pivot joints so that the two controllers are movably connected to the retractable part via the two pivot joints, respectively;

wherein two opposite sides of each of the two pivot joints are respectively pivotable relative to the retractable part and one of the two controllers about a first axis and a second axis parallel to each other.

* * * * *